March 5, 1940.    V. O. BEAM    2,192,630

GAS CONTROL FOR BOILERS AND THE LIKE

Filed March 8, 1937    2 Sheets-Sheet 1

INVENTOR.
VILYNN O. BEAM
BY
Kwis Hudson & Kent
ATTORNEYS

March 5, 1940. V. O. BEAM 2,192,630
GAS CONTROL FOR BOILERS AND THE LIKE
Filed March 8, 1937 2 Sheets-Sheet 2
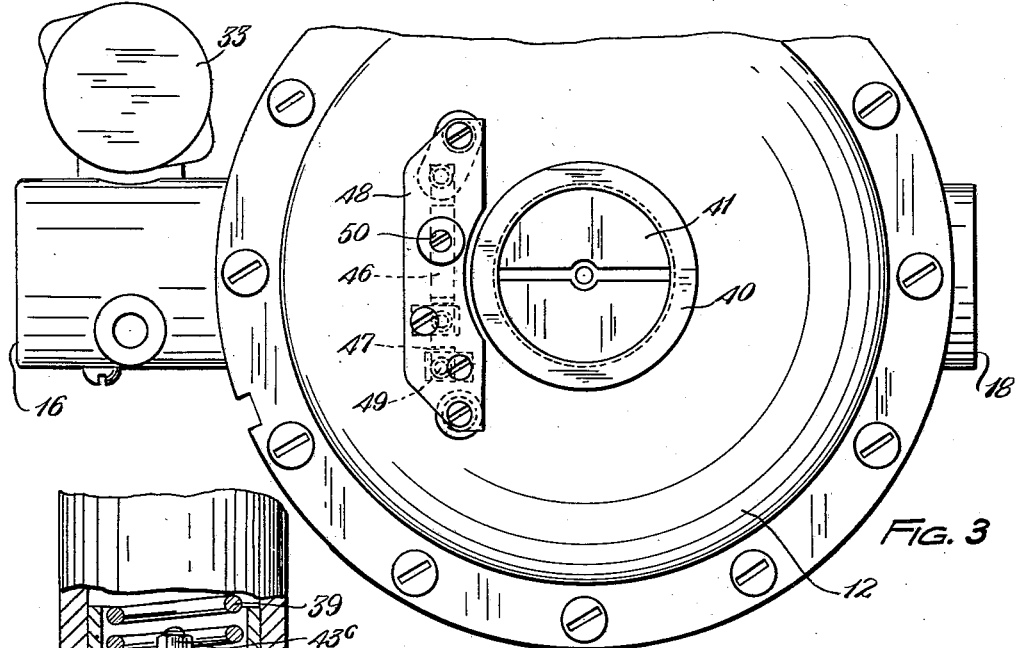
Fig. 3
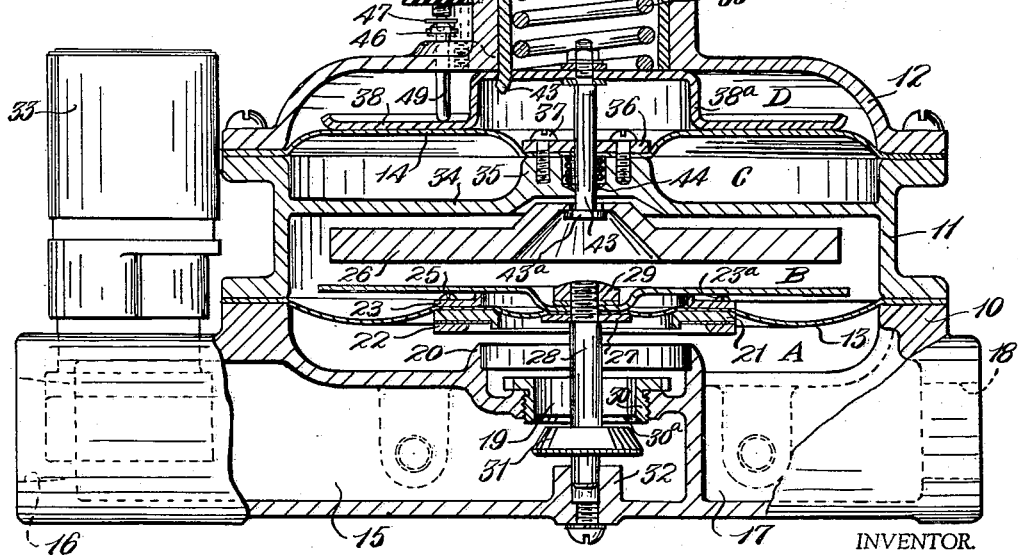
Fig. 5
Fig. 4
INVENTOR.
VILYNN O. BEAM
BY Kwis Hudson & Kent
ATTORNEYS Patented Mar. 5, 1940

2,192,630

UNITED STATES PATENT OFFICE 2,192,630

GAS CONTROL FOR BOILERS AND THE LIKE

Vilynn O. Beam, Cleveland Heights, Ohio, assignor to The Bryant Heater Company, Cleveland, Ohio, a corporation of Ohio Application March 8, 1937, Serial No. 129,645

8 Claims. (Cl. 137—139)

This invention relates to a gas controlling member for use in connection with boilers, furnaces, and the like, and has for its principal object to provide a unitary or self-contained control member which performs functions which heretofore have required several separate control instrumentalities.

The control member formed in accordance with the present invention combines into one unit a main shut-off valve, a gas pressure regulator, and a gas throttling device which functions to vary the effect of the pressure regulator so as to cause it to maintain a much lower pressure or even to cause the gas to be shut off entirely on the occurrence of a predetermined condition in the boiler or furnace such as a given steam pressure or water or air temperature, or a predetermined temperature in the room or building being heated. In certain respects this invention is an improvement over the device shown in the application of Otto Fox, Serial No. 86,389, filed June 20, 1936, in which there is disclosed a combined diaphragm valve and pressure regulator wherein the diaphragm of the valve has attached to it the movable member of a pressure regulator valve.

The invention may be further briefly summarized as consisting in novel details of construction and combinations and arrangements of parts which will be described in the specification and set forth in the appended claims.

In the accompanying sheets of drawings wherein I have shown the preferred embodiment of the invention, Fig. 1 is a side view of my improved gas control unit with portions in section, the diaphragm valve being closed, with the parts of the valve, the pressure regulator, and the gas throttling parts of the unit in their lowermost positions;

Fig. 3 is a top plan view with parts broken away;

Fig. 4 is a view substantially similar to Fig. 1 with the valve open and with the diaphragm and the follower of the gas throttling device in their uppermost positions; and Fig. 5 is a fragmentary view, partly in section and partly in elevation, of the upper part of the device showing a slight modification.

Figure 1:
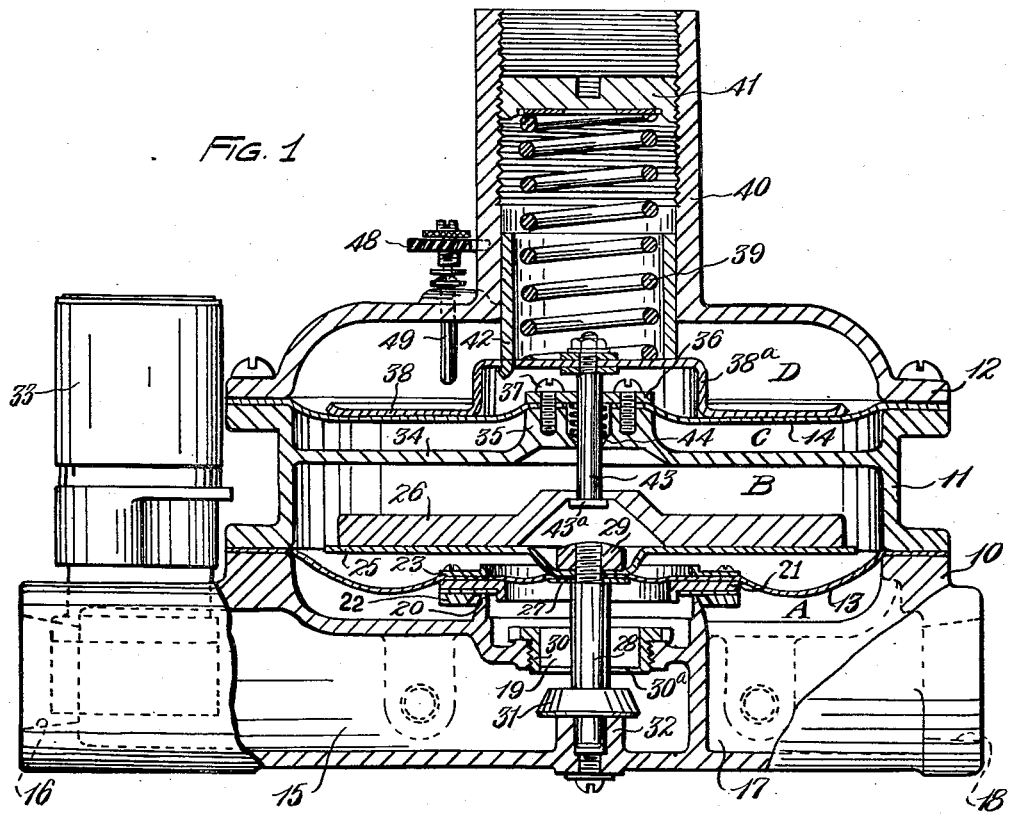

In the embodiment of my invention herein illustrated, the device includes a casing which is composed of three main parts, to-wit, a lower member 10, an intermediate member 11, and a top member 12. All three casing parts are generally circular in outline with peripheral flanges secured together by screws or the like, and clamped between the flanges of the lower and intermediate members 10 and 11 there is a flexible diaphragm 13, and clamped between the peripheral flanges of the intermediate and top members 11 and 12 there is a flexible diaphragm 14. There are thus formed on opposite sides of the diaphragm 13 chambers A and B and on opposite sides of the diaphragm 14 chambers C and D.

Formed in the lower casing member 10 is a gas inlet chamber 15 to which a gas supply pipe may be connected at 16 and a chamber 17 to which a gas delivery pipe may be connected at 18. Between these two chambers 15 and 17 there is a passageway 19 and concentric with this passageway and above the same is an annular upstanding valve seat 20 which is adapted to be engaged by a suitable seating member 21 in the form of an annulus which is carried on the lower side of the diaphragm 13 and is secured thereto between clamping members 22 and 23 through which fastening screws 23a pass. When the valve is open, as shown in Fig. 4, the gas passes from the supply pipe connected at 16 to the chamber 15 upwardly through the passageway 19 through and upwardly over the annular seat 20 and out by way of the passageway 17 to the gas delivery pipe connected at 18.

In this instance, as is usually the case with main control valves of the diaphragm type adapted to supply gas to burners of boilers, furnaces, water heaters, and the like, when gas pressure is supplied to the chamber B the diaphragm will be lowered so that the seating member 21 will engage the seat 20 so as to shut off the flow of gas, and, when the gas pressure is exhausted from chamber B, the diaphragm 13 will be lifted by the pressure beneath it so as to permit gas to pass to the burner or burners.

Figure 2:
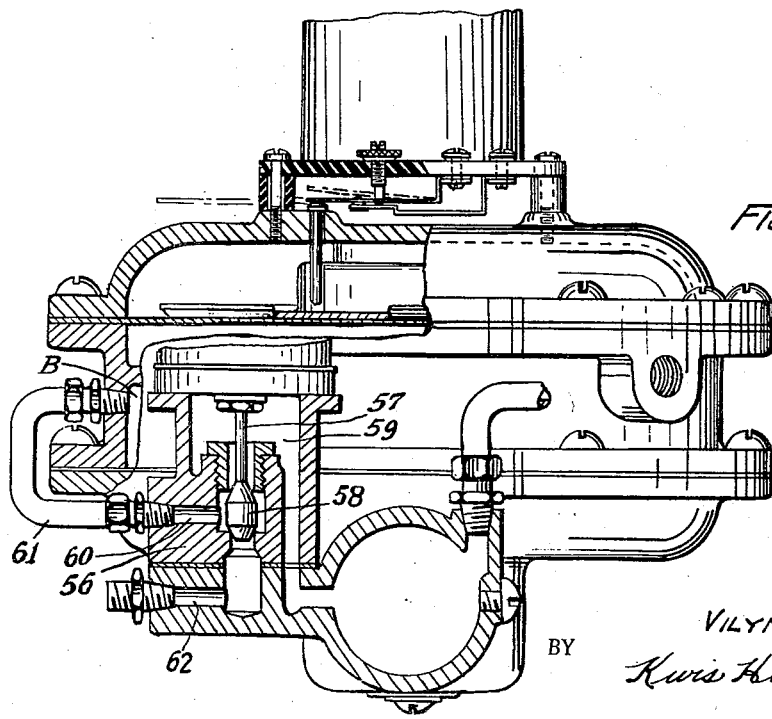
Fig. 2 is a view with parts broken away, looking toward the left-hand end of Fig. 1, the follower which is actuated by the diaphragm of the gas throttling device of the unit being somewhat elevated from its position shown in Fig. 1.

The supplying of pressure to and the bleeding of pressure from chamber B is preferably controlled through an auxiliary solenoid valve designated as a whole by the reference character 56 and including a solenoid coil having a plunger 57 which is connected to a valve 58, see particularly Fig. 2. The details of the auxiliary or solenoid valve 56 are immaterial to the present invention, and it would be sufficient to state that when the solenoid is deenergized the valve member 58 engages a lower seat, as illustrated in Fig. 2, gas then passing from the inlet pipe 15 of the unit by way of passageway 59 to a chamber above the valve member 58 and then by way of a passageway 60 to a pipe 61 which is connected to the chamber B above the diaphragm 13. When the solenoid is energized, the movable valve member 58 is drawn upwardly so as to engage an upper seat and the effect of this is to shut off the supply of pressure by way of the passageway 59 and at the same time to connect pipe 61 and passageway 60 to an exhaust passageway 62 to which an escapement or bleed pipe is usually connected. Thus when the solenoid is energized pressure is exhausted from the chamber B allowing the gas pressure beneath it to lift the diaphragm and supply gas to the main burners.

It is desirable that the upward movement of the diaphragm 13, due to the exhausting of gas from the chamber B, be resisted by suitable means which in this instance is in the form of two weights 25 and 26, the latter being much heavier than the former and being arranged above it and at times resting thereon, and under certain conditions or when a certain condition is reached, which may be predetermined steam pressure, predetermined water temperature in the boiler being heated, or predetermined room temperature, this upper weight 26 is designed to be lifted from the lower weight 25, as shown, for example, in Fig. 4. The lower and lighter weight 25 is in this instance in the form of a flat circular disk which extends laterally nearly to the periphery of the chamber B, forming an upper flat seating surface of considerable area for the upper and larger weight 26, and this disk or lower weight 25 normally rests on an upturned flange of the seat clamping member 23, or on the heads of screws 23a which pass through the annular clamping members 22 and 23 and through the annular seat member 21 which is thus secured to the diaphragm. The central part of the disk or lower weight 25 is depressed, as shown, and the depressed central part engages and is clamped to the central part of the diaphragm 13, these being securely clamped together between a disk 27 resting on a shoulder of a vertical stem 28 and a nut 29 with its associated lock washer, the nut being screwed on the upper end of the stem. A thoroughly gas-tight joint is thus formed. The stem 28 passes centrally through the central clamped part of the diaphragm just described and extends downwardly therefrom through the passageway 19 which is formed by a sleeve 30 threaded into an appropriate portion of the lower casing member 10. Near its lower end this stem is provided, as in the Fox application referred to above, with a throttling member 31 constituting the movable member of the pressure regulator, the lower end of the stem being provided with a reduced guiding portion entering into an opening in a boss 32 formed at the bottom of the casing member 10. The periphery of this movable member 31 of the throttling valve is tapered and there is a corresponding taper 30a at the bottom of the sleeve 30 which forms the stationary member of the throttling valve or pressure regulator. When the main valve is closed by the seat member of the diaphragm 13, the movable throttling valve member 31 rests upon the top of the boss 32, and at such time the load, due to the weights 25 and 26, the stem 28 with its clamping members at the top, and the movable valve member 31, will be transmitted to the boss 32 and the diaphragm 13 will be relieved thereof.

When the diaphragm valve is used with gas-consuming apparatus, an auxiliary valve, usually a solenoid valve, is employed to automatically control the supply of gas pressure to and the bleeding of gas pressure from the chamber B. The details of this auxiliary valve are not important to the present invention and therefore the valve is indicated more or less conventionally at 33. Passageways or small auxiliary piping of any kind may be employed between the auxiliary valve and the chamber B, but in this instance there will be employed a pipe which will be connected to the threaded opening 24 previously referred to. When pressure is supplied to the chamber B, the main valve is closed with the diaphragm, weights, and throttling valve in the position shown in Fig. 1. However, when pressure is bled from the chamber B through the action of the auxiliary solenoid valve, the seating portion of the diaphragm lifts from the seat, but during the initial movement the weights are not elevated. The initial unseating allows the gas pressure to build up under the entire lower surface of the diaphragm 13, and after this initial lifting of the diaphragm, the metal parts above the seating portion of the diaphragm, in this instance the heads of the clamping screws which secure the seat 21 to the diaphragm, engage the lower weight 25 and lift both weights. Thus the weights are lifted without imposing any material stress upon the diaphragm.

As the diaphragm 13 moves upwardly and the weights are lifted, the pressure regulating valve member 31 enters more or less into the sleeve 30 to a predetermined position, after which the weights and the diaphragm float in substantially fixed position so long as the gas pressure remains steady, thus holding the outlet pressure, i. e., the pressure of the gas leaving the chamber 17, at a predetermined value. Of course, if the inlet pressure increases, the further lifting of the diaphragm and weights causes the valve member 31 to more closely approach the tapered seat 30a at the lower end of the sleeve 30 so as to throttle the pressure. Conversely, if the gas pressure in the inlet chamber 15 drops, the weights and the diaphragm are lowered and the valve member 31 is also lowered from the tapered seat, allowing gas to flow more freely through the passageway 19 and out by way of the outlet chamber 17. Accordingly, the pressure on the delivery side of the valve is maintained substantially constant due to the action of the regulating valve with its mechanical connection with the diaphragm 13, and, accordingly, under normal conditions the main shut-off valve and the attached and associated throttling or regulator valve function as described in the Fox application.

By the improvements of the present invention, the biasing means, i. e., the dead weight on the diaphragm 13, is reduced so that the regulator will throttle the gas to a much lower delivery pressure, that is, to a fraction of the normal delivery pressure, and may even shut off the gas entirely on the occurrence of a predetermined pressure or temperature condition, as will now be explained.

It will be observed that the chambers B and C are separated from each other by a wall 34 extending across the intermediate casing member 11 near its top. Likewise it will be seen that this wall has an upstanding central boss 35 to the top of which the central part of the diaphragm 14 is clamped by a disk 36 and clamping screws 37. The portion of the diaphragm 14 between the central part which is clamped to the boss 35 and the peripheral part which is clamped between the casing members 11 and 12 is free to rise or fall with the variation in pressure in chamber C. The upper side of the diaphragm 14 is engaged by a follower 38 and the upward movement of the diaphragm and the follower is resisted by a stiff coil spring 39 which extends up into an internally threaded tubular extension 40 at the central top portion of the upper casing member 12. The strength of this spring can be adjusted by adjusting a nut 41 which is screwed into the tubular extension 40, this nut being engaged by the upper end of the spring 39 while the lower end of the spring bears against an elevated central part 38a of the follower 38. To the latter is attached an upstanding sleeve 42 which lies between the spring and the boss 40 and serves as a guide to insure the follower's moving vertically as the diaphragm 14 rises and falls.

Attached to the central part of the elevated portion 38a of the follower 38 is a stem 43 which extends down through the clamping disk 36 and through the central boss 35 of the partition wall 34. The stem also passes freely through an opening in a central elevated part of the weight 26, the lower side of the boss 35 being somewhat elevated to accommodate the elevated central part of the weight 26. At the lower end of the stem 43 there is a head 43a forming a shoulder which is adapted to engage the under side of the central elevated part of the weight 26 and thus lift the latter from the weight 25 when the follower 38 has been elevated a certain distance by the pressure in the chamber C. The stem 43 is designed to move freely through the boss 35 but at the same time leakage of gas from the chamber B to the upper chamber D is not desired. I accomplish this by providing in the recess of the boss surrounding the stem 43 a novel form of packing 44 consisting preferably of a quantity of graphited candlewick packing which is held at the bottom of the recess and against the stem by a coil spring which is between this packing and the disk 36 above.

Thus when the pressure supplied to chamber C builds up to a predetermined value, it will overcome the downward pressure of spring 39 and lift the follower 38, thus elevating the stem 43. During the initial upward movement of the stem 43, the latter will move relative to the weight 26 by reason of the clearance provided for the head of the stem on the lower central part of the weight 26, but as the pressure increases in chamber C, the head at the lower end of stem 43 engages and gradually lifts the weight 26. This results in the raising of the diaphragm 13 of the main valve and also of the regulator member 31, and the pressure of the gas delivered to the burner or burners is thus gradually reduced. As the pressure in chamber C continues to rise further, the weight 26 will be lifted entirely from the lower weight 25, and the upward movement of the diaphragm, now opposed only by the weight 25, ceases, with the regulator member 31 in such a position with reference to the seat at the lower end of the sleeve 30 as to cause the pressure which is delivered to the burner or burners to be at a predetermined low value. Of course, the initial outlet pressure when the upward movement of the diaphragm 13 is resisted by both the weights 25 and 26 and also the final and greatly reduced pressure when its upward movement is resisted by the lower weight 25 may be made anything desired. In practice, I have obtained very good results with an initial outlet pressure of 3-inch water column and a reduced pressure of ½-inch water column when the weight 26 is lifted clear of the lower weight 25.

The pressure may be supplied to chamber C by different gaseous or liquid media, such as water, steam, or fuel gas. I have used this device very advantageously as a steam pressure control, and in that event steam is supplied from the boiler by a suitable pipe to chamber C, in which case the steam pipe may be connected to an opening 45 provided in the intermediate casing member 11 and leading to the chamber C. I may, however, supply gas to chamber C, i. e., fuel gas, to an amount dependent upon the temperature of the water in the boiler. In that event a thermal element subjected to the water temperature in the boiler will actuate a valve which controls the gas pressure supplied to the chamber C, or the valve which controls the gas pressure in the chamber C may be actuated by a thermometer or thermal element controlled by the temperature in the building being heated.

If, notwithstanding the reduction in pressure at the delivery side of the main valve, the pressure in chamber C continues to rise, it is desirable that the main valve be closed so as to shut off entirely the flow of gas to the burner or burners, and, in accordance with the present invention, provision is made for accomplishing this result through the continued upward movement of the follower 38. I prefer to accomplish this by having the follower 38 adjacent its upward limit of travel cause the opening of a switch in the circuit of the solenoid of the solenoid valve 35. To this end I provide on the upper casing member 12 alongside the tubular extension 40 a switch consisting of a pair of contact blades 46 and 47 having contact points which are normally in engagement, these contact blades being carried by an insulating support 48 mounted on the casing member 12. Likewise, I extend through the top of the casing member 12 a pin 49 the head of which normally rests on a boss or shoulder provided on the casing member 12 directly beneath the end of the contact blade 47 which projects beyond the cooperating blade 46 of the switch. The pin normally extends freely into the chamber D and above and out of contact with the follower 38, but when the pressure in the chamber C reaches a predetermined value so that the follower is lifted to substantially its uppermost position shown in Fig. 4, the pin 49 is pushed upwardly, elevating blade 47 and separating the contacts so as to open the switch, thereby causing the deenergization of the solenoid valve 33 which results in the supply of pressure to chamber B above the diaphragm 13 and the closure of the main control valve. The position of the follower at which this occurs and therefore the pressure in chamber C at which the switch is opened can be varied by an adjusting screw 50 which adjusts the normal position of the contact 46.

It is desired, when the follower 38 is in its uppermost position, in this instance in engagement with the top member 12 of the casing, that the central part of the weight 26 bear against the lower side of the partition 34. This insures that the weight 26 will be square with respect to the vertical axis of the device and entirely clear of the lower weight or disk 25. The simultaneous seating of the follower 38 against the top member 12 and of the weight 26 against the partition 34 requires careful machining if the stem 43 has a fixed connection with the upper central part of the follower. To permit greater tolerances in the manufacture of the device and to facilitate assembly, it may be desirable to permit the weight to seat against the partition 34 before the follower seats against the top member 12 of the casing, which can be readily done by having either a yieldable connection between the stem and the follower or between the stem and the weight 26.

In Fig. 5 I have shown a modification wherein the stem is yieldingly connected to the follower 38 so as to permit the seating of the follower after the weight 26 reaches its uppermost position and is seated against the partition. In this figure, the stem, which corresponds to the stem 43 of Figs. 1 and 4, is designated 43b and whose lower end will be arranged with respect to the weight 26 as shown in Figs. 1 and 4, passes freely through an opening in the top central part of the follower and through an auxiliary spring 51 inside the pressure control spring 39. This spring 51, which forms the yielding connection between the stem and the follower, is in this instance enclosed in an inverted cup 52. The lower end of the spring 51 bears against the follower 38 while its upper end bears against the top wall of the cup and the latter bears against an adjustable nut 43c threaded on the end of stem 43b. The bottom of the cup has a suitable clearance with respect to the top of the follower. On the stem 43b beneath the follower is a suitable shoulder or abutment 43d which is adapted to engage the under side of the follower to limit the upward movement of the stem under the action of spring 51.

With this arrangement, before the weight 26 contacts with the partition 34 the abutment 43d will be in engagement with the lower side of the follower 38. If the weight 26 engages the partition 34 before the follower is in its uppermost position, the follower will continue to rise relative to the stem 43b until the top of the follower engages the top 12 of the casing, the spring 51 yielding to permit this relative movement.

Thus it will be seen that when the steam pressure or temperature is less than a predetermined value, the present device in the form of a single instrumentality functions (1) as a main shut-off valve; (2) as a pressure regulator to maintain under normal conditions a predetermined delivered gas pressure; (3) as a throttling device or regulator modifier when the condition (steam pressure or temperature) becomes abnormal or reaches a predetermined abnormal value, in which case the pressure supplied to the upper pressure chamber responds so as to change the biasing means normally acting on the valve diaphragm so that the regulator functions to cause the delivery of gas at a predetermined lower pressure; and (4) as a safety device which functions if the steam pressure or temperature continues to rise and causes the main gas valve to close and stop entirely the flow of gas to the burner or burners.

Not only do I regard my improved control effective and novel when associated with the combined diaphragm valve and regulator of the type shown in the Fox application referred to herein, but, so far as I am aware, an automatic control which functions to change the action of a pressure regulator which may act independently of or be mechanically separate from a shut-off valve is novel and has utility in gas consuming apparatus. I therefore do not desire to be confined to a unitary instrumentality which functions as a main shut-off valve, as a pressure regulator, and as a control or modifier of the pressure regulator so as to alter the biasing means which changes the delivery pressure, nor do I desire to be otherwise confined to the precise details shown but aim in my claims to cover all modifications which do not involve a departure from the spirit and scope of the invention in its broadest aspects.

Having thus described my invention, I claim:

1. A gas shut-off valve of the diaphragm type including a casing having a gas inlet and a gas outlet, a valve seat, a diaphragm having a seating portion and movable toward and from the seat, means including an electrically operated valve for supplying and exhausting pressure above the diaphragm, biasing means normally acting on the diaphragm to oppose its movement in one direction, the casing having a chamber containing a second diaphragm with means whereby fluid pressure may be supplied to one side of said second diaphragm to actuate the same, a follower adapted to be actuated by the movement of the second diaphragm, means actuated by said follower for changing the biasing means on the first named diaphragm, and a controlling switch for said electrically operated valve adapted to be operated by said follower when the pressure on one side of said second diaphragm reaches a predetermined value.

2. In a gas shut-off and controlling device of the character described, a casing having a gas inlet and a gas outlet, a seat in the casing, a diaphragm having a seating portion adapted to be actuated by differential gas pressure to open and close the valve, a weight above the diaphragm normally opposing its movement in one direction, a pressure regulating member attached to said diaphragm, a chamber in the casing above the first named diaphragm and above the weight, a diaphragm therein forming a fluid pressure chamber on one side thereof, a follower adapted to be moved by said second diaphragm, means by which the movement of said follower lifts the weight from biasing relation with the first mentioned diaphragm when the pressure on said second diaphragm reaches a predetermined value.

3. In a gas shut-off and controlling device of the character described, a casing having a gas inlet and a gas outlet, a seat in the casing, a diaphragm having a seating member adapted to be actuated by differential gas pressure to open and close the valve, means including an electrically operated valve for supplying and exhausting pressure above the diaphragm, a biasing means acting on the diaphragm and normally opposing its movement in one direction, a pressure regulating member attached to said diaphragm, a chamber above the first named diaphragm, a diaphragm therein forming a pressure chamber on one side thereof, a follower adapted to be moved by the second diaphragm, means by which the movement of said follower changes the effect of the biasing means on the first named diaphragm when the pressure on said second diaphragm reaches a predetermined value, and a controlling switch for said electrically operated valve actuated by said follower when pressure on said diaphragm reaches a still greater predetermined value.

4. A combined diaphragm valve and pressure regulator comprising a casing having a gas inlet and a gas outlet, a valve opening surrounded by a valve seat and a regulator opening between said inlet and outlet, a diaphragm located at one side of said inlet and outlet and adapted to cooperate with said valve seat to establish or shut off communication therebetween, said diaphragm forming with a portion of said casing a chamber at one side of the diaphragm, valve controlled means for supplying fluid pressure to the last mentioned chamber to cause the seating of the diaphragm and for exhausting pressure from said chamber to cause its unseating, a regulator valve member operatively connected to the diaphragm and cooperating with said regulator opening, biasing means in said chamber and effective when the diaphragm valve is open for biasing said diaphragm toward closed position, a second chamber above the first named chamber and having a diaphragm forming one wall thereof, said last named diaphragm being operatively connected to said biasing means, and means for supplying pressure to said second chamber to actuate said last mentioned diaphragm so as to reduce the effect of said biasing means when the pressure in said second chamber is increased to a predetermined value.

5. In a gas control device of the character described, a casing having a gas inlet, a gas outlet, a diaphragm in the casing movable in one direction by gas pressure, a pressure regulating member attached thereto, biasing means in the casing above said diaphragm normally effective for opposing the movement of the diaphragm in one direction under the pressure of the gas passing from the inlet to the outlet, a chamber in the casing above said biasing means having a pressure responsive device, and means for supplying pressure to said chamber independent of the pressure of gas in said inlet or outlet, said pressure responsive device being operatively connected to said biasing means and serving to reduce the effect thereof on said diaphragm on a predetermined increase of pressure in said chamber.

6. In a gas control device of the character described, a casing having a gas inlet, a gas outlet, a diaphragm in the casing movable in one direction by gas pressure, a pressure regulating member attached thereto, biasing means in the casing above said diaphragm normally effective for opposing the movement of the diaphragm in one direction under the pressure of the gas passing from the inlet to the outlet, a chamber in the casing above said biasing means having a diaphragm forming the upper wall thereof, and means for supplying pressure to said chamber beneath said second diaphragm, said second diaphragm being operatively connected to said biasing means and serving to reduce the effect thereof on said first named diaphragm on a predetermined increase of pressure in said chamber.

7. In a gas control device, a casing having a gas inlet, a gas outlet, a diaphragm in the casing subjected to the pressure of the gas in passing from the inlet to the outlet, a pressure regulating member attached to the diaphragm, biasing means including a weight normally supported by said diaphragm opposing the movement of the diaphragm in one direction under the pressure of the gas passing from the inlet to the outlet, a chamber in said casing, a diaphragm forming one wall thereof, an operative connection between the second named diaphragm and said weight, and means by which pressure may be supplied to said chamber beneath the diaphragm independently of the pressure of gas in said inlet or outlet to lift the weight out of biasing relation to the first named diaphragm when the pressure in said chamber is increased to a predetermined value.

8. In a gas shut-off and pressure controlling device of the character described, a casing having a gas inlet and a gas outlet, a seat in the casing, a diaphragm having a seating portion adapted to be actuated by differential gas pressure to open and close the valve, a pressure regulating member attached to said diaphragm, a chamber above the diaphragm, means for supplying fluid pressure to said chamber to cause seating of the diaphragm and for exhausting pressure from said chamber to cause its unseating, biasing means in said chamber normally opposing the movement of the diaphragm in one direction, a second chamber in said casing, a diaphragm forming one wall of said chamber, means by which fluid pressure may be supplied to said second chamber, and means forming an operative connection between said diaphragm and said biasing means and serving to reduce the effect of said biasing means on the first mentioned diaphragm when the pressure in said second chamber is increased to a predetermined value.

VILYNN O. BEAM.